(12) United States Patent
Watanabe et al.

(10) Patent No.: US 8,875,522 B2
(45) Date of Patent: Nov. 4, 2014

(54) MAGNETIC HEAT PUMP APPARATUS

(75) Inventors: Naoki Watanabe, Kariya (JP); Tsuyoshi Morimoto, Obu (JP); Shinichi Yatsuzuka, Nagoya (JP)

(73) Assignee: Denso Corporation, Kariya (JP)

( * ) Notice: Subject to any disclaimer, the term of this patent is extended or adjusted under 35 U.S.C. 154(b) by 174 days.

(21) Appl. No.: 13/472,892

(22) Filed: May 16, 2012

(65) Prior Publication Data

US 2012/0291453 A1 Nov. 22, 2012

(30) Foreign Application Priority Data

May 17, 2011 (JP) ................................. 2011-110616

(51) Int. Cl.
*F25B 21/00* (2006.01)

(52) U.S. Cl.
CPC ........ *F25B 21/00* (2013.01); *G60H 2001/3295* (2013.01); *Y02B 30/66* (2013.01)
USPC ................................................. 62/3.7; 62/3.1

(58) Field of Classification Search
USPC ................................. 62/3.1, 3.2, 3.3, 3.7, 462
See application file for complete search history.

(56) References Cited

U.S. PATENT DOCUMENTS

| | | | |
|---|---|---|---|
| 2004/0194855 A1 | 10/2004 | Fukamichi et al. | |
| 2006/0218936 A1* | 10/2006 | Kobayashi et al. | 62/3.1 |
| 2009/0217675 A1* | 9/2009 | Kobayashi et al. | 62/3.1 |
| 2011/0048690 A1 | 3/2011 | Reppel et al. | |

FOREIGN PATENT DOCUMENTS

| | | | |
|---|---|---|---|
| JP | 2002-106999 | | 4/2002 |
| JP | 2002106999 A | * | 4/2002 |
| JP | 2006308197 A | * | 11/2006 |
| JP | 2009-281685 | | 12/2009 |
| JP | 4387892 | | 12/2009 |
| JP | 2009281683 A | * | 12/2009 |
| JP | 2010112606 A | * | 5/2010 |
| JP | 2012-177499 | | 9/2012 |
| WO | WO2012/056585 | | 5/2012 |

OTHER PUBLICATIONS

Office Action issued May 7, 2013 in corresponding Japanese Application No. 2011-110616 (with English translation).
Office action dated Nov. 5, 2013 in corresponding Japanese Application No. 2011-110616.

* cited by examiner

*Primary Examiner* — Allana Lewin
*Assistant Examiner* — Kun Kai Ma
(74) *Attorney, Agent, or Firm* — Harness, Dickey & Pierce, PLC

(57) ABSTRACT

A magnetic heat pump apparatus includes: a container defining a work chamber; a magnetic working element arranged in the work chamber; a magnetic-field applier that alternately applies a magnetic field to the magnetic working element and removes the magnetic field from the magnetic working element in a magnetic-field direction; and a transportation device that transports heat medium to reciprocate in a reciprocation direction. The magnetic-field direction and the reciprocation direction intersect with each other. The magnetic working element is one of a plurality of magnetic working elements. Each of the plurality of magnetic working elements has a column shape extending in the magnetic-field direction.

12 Claims, 8 Drawing Sheets

MAGNETIC HEAT PUMP APPARATUS

CROSS REFERENCE TO RELATED APPLICATION

This application is based on Japanese Patent Application No. 2011-110616 filed on May 17, 2011, the disclosure of which is incorporated herein by reference in its entirety.

TECHNICAL FIELD

The present disclosure relates to a magnetic heat pump apparatus.

BACKGROUND

JP-B2-3967572 (US 2004/0194855) describes a magnetic heat pump apparatus using a magneto-caloric effect of a magnetic working substance. The magnetic working substance is shaped into minute spheres and is filled in a work chamber. A magnetic filed is alternately impressed to or removed from the magnetic working substance. Heat medium is made to reciprocate in the work chamber, synchronizing with the impression and removal of the magnetic field, so that the magnetic heat pump apparatus achieves heat transport. Specific surface area of the magnetic working substance is increased due to the minute spherical shape, and heat exchange is facilitated between the magnetic working substance and the heat medium.

However, magnetic reluctance becomes large when the magnetic field is impressed to the magnetic working substance because the magnetic working substance has the fine spherical state. Further, the amount of heat emitted or absorbed is not sufficiently increased when the magnetic field is impressed to or removed from.

SUMMARY

It is an object of the present disclosure to provide a magnetic heat pump apparatus having high efficiency.

According to an example of the present disclosure, a magnetic heat pump apparatus includes a container, a magnetic working element, a magnetic-field applier, a transportation device, a heat emitting portion and a heat absorbing portion. The container defines a work chamber, and heat medium reciprocates between a first end part and a second end part of the work chamber in a reciprocation direction. The magnetic working element is made of magnetic working substance having magneto-caloric effect, and is arranged in the work chamber and located between the first end part and the second end part. The magnetic-field applier alternately applies a magnetic field to the magnetic working element and removes the magnetic field from the magnetic working element in a magnetic-field direction intersecting with the reciprocation direction. The transportation device transports the heat medium in synchronization with the applying and the removal of the magnetic field. The heat emitting portion emits heat of the heat medium located adjacent to the first end part to outside. The heat absorbing portion absorbs outside heat into the heat medium located adjacent to the second end part. The magnetic working element is one of a plurality of magnetic working elements arranged in the work chamber, and each of the plurality of magnetic working elements has a column shape extending in the magnetic-field direction.

Accordingly, the magnetic heat pump apparatus has high efficiency.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiment

Figure 2:
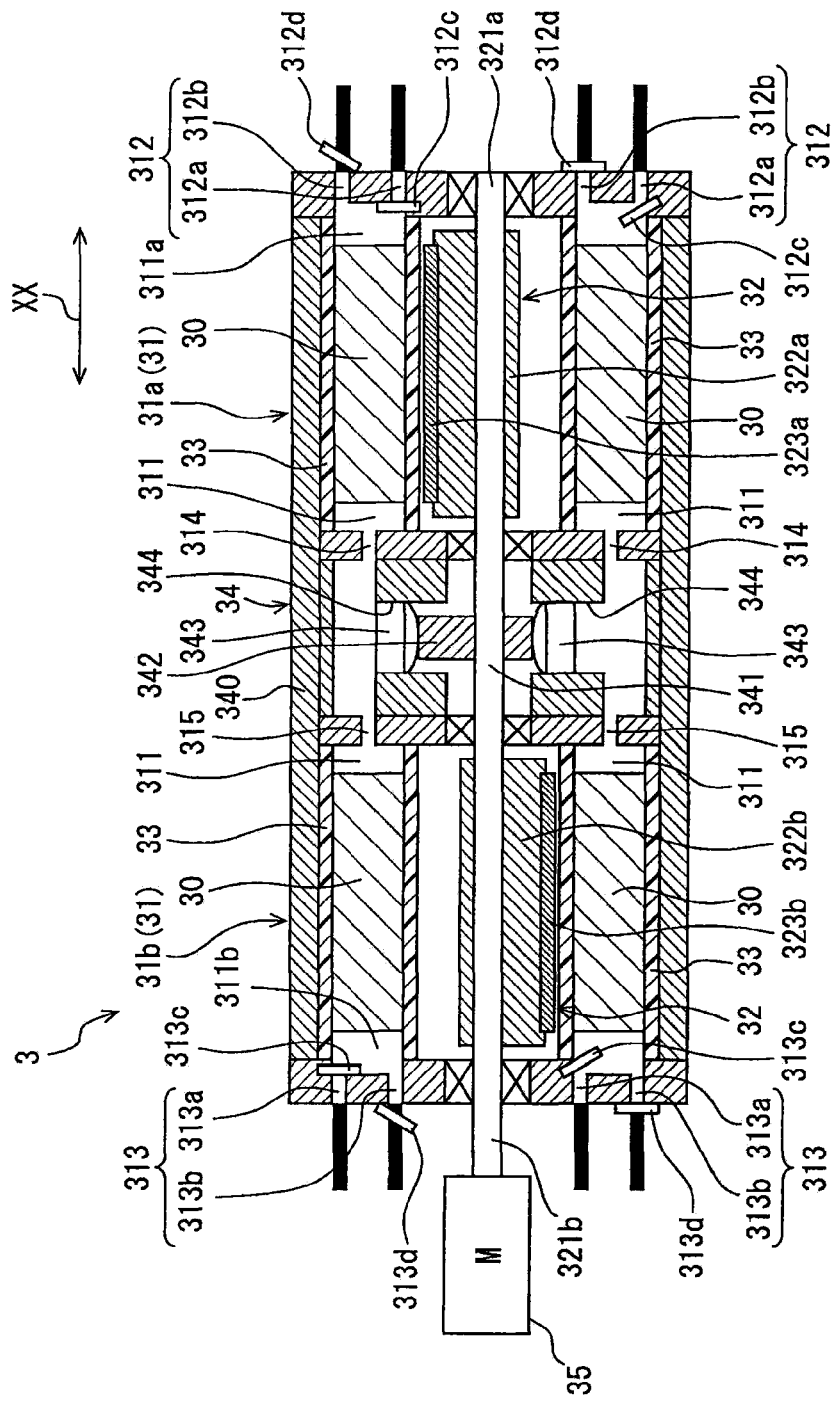
FIG. 2 is an axial cross-sectional view illustrating the magnetic heat pump apparatus.

A magnetic refrigerating system 2 is applied to an air-conditioner 1 for a vehicle, and corresponds to a magnetic heat pump apparatus according to an embodiment. The magnetic refrigerating system 2 has a magnetic refrigerator 3. FIG. 2 is a cross-sectional view of the magnetic refrigerator 3 which is taken along a line II-II of FIG. 3.

The air-conditioner 1 conducts air-conditioning for a passenger compartment of the vehicle. The air-conditioner 1 is mounted to the vehicle which obtains driving force from an internal combustion engine.

Figure 1:
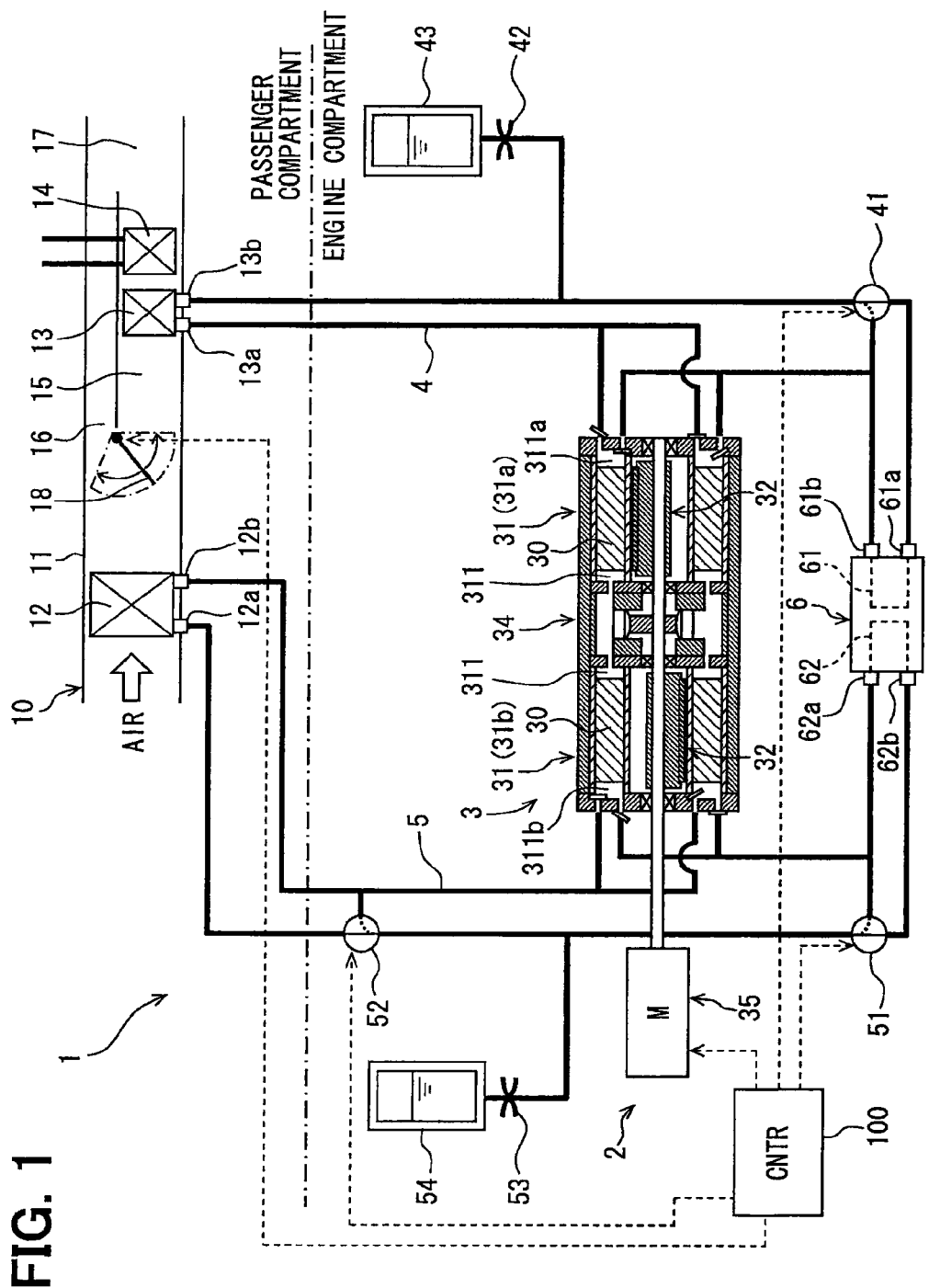
FIG. 1 is a schematic view illustrating an air-conditioner including a magnetic heat pump apparatus according to an embodiment.

As shown in FIG. 1, the magnetic refrigerating system 2 is arranged in an engine compartment of the vehicle. An indoor air-conditioning unit 10 of the air-conditioner 1 is arranged in the passenger compartment. The air-conditioner 1 has an air-conditioning controller 100.

The magnetic refrigerating system 2 has a refrigerant circuit 4, 5 that is controlled to be switched among a cooling mode, a heating mode and a dehumidification mode. The passenger compartment is heated when the heating mode is set, and is cooled when the cooling mode is set. In the dehumidification mode, the passenger compartment is dehumidified while a heating operation is conducted. The air-conditioner 1 cools, heats, or dehumidifies for the passenger compartment.

The magnetic refrigerating system 2 is an active magnetic refrigerator (AMR) type system which stores cold energy and hot energy in a magnetic working element 30 made of a magnetic working substance, when the cold energy and the hot energy are generated by magneto-caloric effect of the magnetic working substance. The magnetic refrigerating system 2 has the magnetic refrigerator 3, the first (high temperature) refrigerant circuit 4 and the second (low temperature) refrigerant circuit 5. The magnetic refrigerator 3 generates the cold energy and the hot energy due to the magneto-caloric effect.

Heat medium circulates in the high temperature refrigerant circuit 4 from the magnetic refrigerator 3 to a first (heating) heat exchanger 13 corresponding to a heat emitting portion when a temperature of the heat medium is raised by the hot energy generated by the magnetic refrigerator 3. The heat medium is, for example, liquid such as water containing anti-freezing solution, and may be referred as refrigerant.

Heat medium circulates in the low temperature refrigerant circuit 5 from the magnetic refrigerator 3 to a second (cooling) heat exchanger 12 corresponding to a heat absorbing portion when a temperature of the heat medium is lowered by the cold energy generated by the magnetic refrigerator 3.

The magnetic refrigerator 3 has a heat exchange container 31, a magnetic-field applier 32, a refrigerant pump 34 and an electric motor 35. The heat exchange container 31 defines a work chamber 311 that accommodates the magnetic working element 30, and refrigerant corresponding to a heat transport medium flows through the work chamber 311.

The magnetic-field applier 32 applies a magnetic field to the magnetic working element 30 and removes the magnetic field from the magnetic working element 30. The refrigerant pump 34 pumps the refrigerant of the heat exchange container 31 to flow, and corresponds to a transportation device that transports the refrigerant. The electric motor 35 is a drive source that drives the magnetic refrigerator 3.

As shown in FIG. 2, the heat exchange container 31 has a high temperature part 31a and a low temperature part 31b. Hot energy is generated in the high temperature part 31a, and cold energy is generated in the low temperature part 31b, due to magneto-caloric effect. The high temperature part 31a and the low temperature part 31b are arranged along with the same axis through the refrigerant pump 34.

The high temperature container 31a, the low temperature container 31b, and the refrigerant pump 34 are integrated and received in the housing 31 of the magnetic refrigerator 3.

Figure 3:
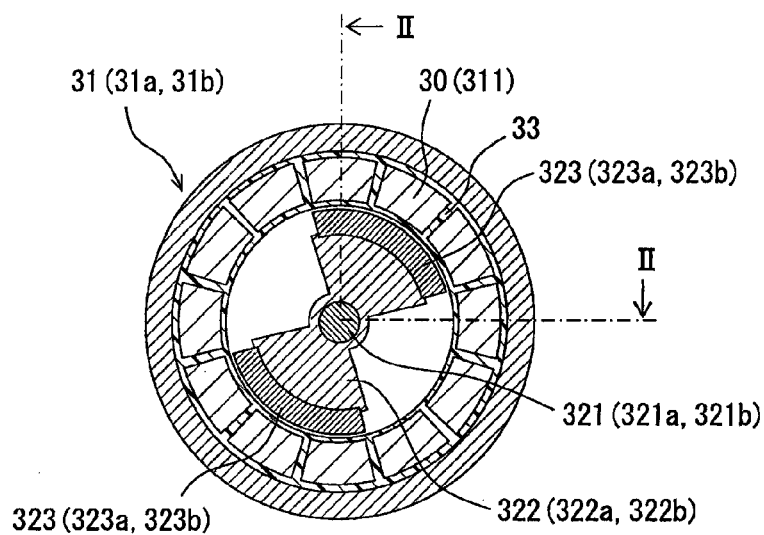
FIG. 3 is a radial cross-sectional view illustrating the magnetic heat pump apparatus.

The high temperature container 31a and the low temperature container 31b are constructed by a hollow cylinder-like container. The container 31a, 31b has the work chamber 311 extending along a circumference wall of the container 31a, 31b. The work chamber 311 accommodates the magnetic working element 30, and refrigerant flows in the work chamber 311. As shown in FIG. 3, plural such as twelve work chambers 311 are defined in the circumference direction at equal interval in the respective containers 31a, 31b.

As shown in FIG. 2, a refrigerant port 312 is defined on an end surface of the high temperature container 31a opposite from the refrigerant pump 34, and a refrigerant port 313 is defined on an end surface of the low temperature container 31b opposite from the refrigerant pump 34. Refrigerant flows into or out of the container 31a, 31b through the refrigerant port 312, 313.

The heat exchange container 31 has a first end portion 311a and a second end portion 311b in an axis (left-and-right) direction XX of the work chamber 311. The work chamber 311 communicates with the refrigerant port 312 through the first end portion 311a, and the work chamber 311 communicates with the refrigerant port 313 through the second end portion 311b.

In FIG. 2, two refrigerant ports 312 are illustrated adjacent to the high temperature container 31a. One of the ports 312 communicates with the upper work chamber 311, and the other of the ports 312 communicates with the lower work chamber 311, for example.

The respective refrigerant port 312 has an inlet 312a that draws refrigerant inward and an outlet 312b that discharges refrigerant outward. A suction valve 312c is arranged to the inlet 312a, and is opened when refrigerant is drawn inward. A discharge valve 312d is arranged to the outlet 312b, and is opened when refrigerant is discharged outward.

In FIG. 2, two refrigerant ports 313 are illustrated adjacent to the low temperature container 31b. One of the ports 313 communicates with the upper work chamber 311, and the other of the ports 313 communicates with the lower work chamber 311, for example.

The respective refrigerant port 313 has an inlet 313a that draws refrigerant inward and an outlet 313b that discharges refrigerant outward. A suction valve 313c is arranged to the inlet 313a, and a discharge valve 313d is arranged to the outlet 313b.

A communication port 314 is defined on an end surface of the high temperature container 31a opposing to the refrigerant pump 34, and a communication port 315 is defined on an end surface of the low temperature container 31b opposing to the refrigerant pump 34. A plurality of the communication ports 314, 315 is defined correspondingly to the refrigerant ports 312 and the refrigerant ports 313.

As shown in FIG. 3, a revolving shaft 321a, 321b, a rotor 322a, 322b and a permanent magnet 323a, 323b are disposed in the container 31a, 31b, and correspond to the magnetic-field applier 32. The rotor 322a, 322b is fixed to the revolving shaft 321a, 321b. The permanent magnet 323a, 323b is buried in the outer circumference surface of the rotor 322a, 322b.

The revolving shaft 321a, 321b is rotatably supported by a bearing defined on end portions of the container 31a, 31b in the axis direction XX.

The revolving shaft 321a of the high temperature container 31a and the revolving shaft 321b of the low temperature container 31b are integrally united with a drive shaft 341 of the refrigerant pump 34.

In FIG. 2, the revolving shaft 321b has a left end opposite from the refrigerant pump 34, and the left end extends outward from the low temperature container 31b. The electric motor 35 is connected to the left end of the revolving shaft 321b, and rotates the revolving shafts 321a, 321b and the drive shaft 341.

In FIG. 3, the rotor 322a, 322b is fixed to the revolving shaft 321a, 321b, and is rotatable through a predetermined space from an inner circumference surface of the container 31a, 31b in a state where the permanent magnet 323a, 323b is fixed to the outer circumference surface of the rotor 322a, 322b.

As shown in FIG. 3, the permanent magnet 323a, 323b is located in two parts in the circumference direction, and periodically approaches the respective work chamber 311 of the container 31a, 31b in accordance with rotation of the revolving shaft 321a, 321b. Each area of the two parts is equal to about ¼ of the outer circumference surface area of the rotor 322a, 322b.

The rotor 322a, 322b has two groove portions located between the two parts in the circumference direction. The groove portion is recessed from the outer circumference surface and extends in the axis direction XX. That is, the groove portion is located at the outer circumference surface of the rotor 322a, 322b not having the permanent magnet 323a, 323b.

The container 31a, 31b and the rotor 322a, 322b work as a yoke. In accordance with rotation of the revolving shaft 321a, 321b, a magnetic field generated by the permanent magnet 323a, 323b is alternately applied to and removed from the magnetic working element 30. The magnetic field is applied to the element 30 in a magnetic-field direction that corresponds to a radial direction of the container 31a, 31b.

A holding member 33 made of non-magnetic material such as resin is disposed to surround the work chamber 311. The positioning of the work chamber 311 in the container 31a, 31b is determined by the holding member 33.

The refrigerant pump 34 is a refrigerant transportation device which causes the refrigerant to reciprocate between the high temperature port 312 and the low temperature port 313 in the container 31. The refrigerant pump 34 is made of, for example, a radial piston pump in which plural pistons 343 are arranged in the circumference direction, as shown in FIG. 2. A control cam 342 is fixed to the drive shaft 341, and moves in the radial direction. The number of the pistons 343 is set the same as the number of the work chambers 311.

As shown in FIG. 2, the refrigerant pump 34 has a housing 340 and a cylinder bore 344, other than the piston 343, the drive shaft 341 and the control cam 342. The drive shaft 341 is rotatably supported in the housing 340. The control cam 342 is fixed to the drive shaft 341 and rotates integrally with the drive shaft 341. The piston 343 reciprocates in the cylinder bore 344 extending in the radial direction in accordance with the rotation of the control cam 342. The piston 343 may be referred as a cam follower. The drive shaft 341 is rotatably supported by a bearing defined on end portions of the housing 340 in the axis direction XX.

The shape of the control cam 342 is determined based on the number of the permanent magnets 323 fixed to the revolving shaft 321. For example, in a case where the number of the permanent magnets 323 is two, the shape of the control cam 342 is determined in a manner that the revolving shaft 321a, 321b has one rotation while the piston 343 goes back and forth two times.

The communication port 314 of the high temperature container 31a and the communication port 315 of the low temperature container 31b communicate with the cylinder bore 344. Thereby, heat exchange is possible between refrigerant of the high temperature container 31a and refrigerant of the low temperature container 31b in the same space constructed by the cylinder bore 344.

The refrigerant pump 34 draws or discharges refrigerant relative to the work chamber 311 in synchronization with the impression or removal of the magnetic field.

For example, when the magnetic field is applied to the magnetic working element 30 of the high temperature container 31a and when the magnetic field is removed from the magnetic working element 30 of the low temperature container 31b, the refrigerant pump 34 discharges refrigerant from the cylinder bore 344 that communicates with the work chamber 311 of the container 31a and the work chamber 311 of the container 31b.

When the magnetic field is removed from the magnetic working element 30 of the high temperature container 31a and when the magnetic field is applied to the magnetic working element 30 of the low temperature container 31b, the refrigerant pump 34 draws refrigerant into the cylinder bore 344 that communicates with the work chamber 311 of the container 31a and the work chamber 311 of the container 31b.

When the refrigerant pump 34 discharges refrigerant into the work chambers 311 of the containers 31a, 31b, the discharge valves 312d, 313d are opened. At this time, refrigerant existing around the end portion 311a, 311b of the work chamber 311 is discharged to outside from the refrigerant outlet 312b, 313b.

When the refrigerant pump 34 draws refrigerant from the work chambers 311 of the containers 31a, 31b, the suction valves 312c, 313c are opened. At this time, refrigerant is drawn from outside into the end portion 311a, 311b of the work chamber 311 through the refrigerant inlet 312a, 313a.

The electric motor 35 is activated by power supplied from an in-vehicle battery (not shown), and drives the magnetic refrigerator 3 by providing drive power to the revolving shafts 321a, 321b and the drive shaft 341.

The magnetic-field applier 32 is constructed by the revolving shaft 321a, 321b, the rotor 322a, 322b, the permanent magnet 323a, 323b, and the electric motor 35. The electric motor 35 is located outside of the container 31. The permanent magnet 323a, 323b corresponds to a magnetic-field generator which generates a magnetic field.

The number of cylinders included in the refrigerant pump 34 corresponds to the number of the work chambers 311 of the container 31, so that the number of cylinders included in the refrigerant pump 34 is twelve in this embodiment. The number of the work chambers 311 means the number of the work chambers 311 of the container 31a or the container 31b, not the total of the containers 31a, 31b. Refrigerant is transported relative to the work chambers 311 using the refrigerant pump 34 although the detailed explanatory drawing is omitted.

Operation of the magnetic refrigerating system 2 will be described. Because the work chambers 311 have the same construction, the description is performed using one representative work chamber 311 located on the upper side in FIG. 2. The plural work chambers 311 have phase shift with each other in the operation of the magnetic refrigerating system 2.

When the piston 343 of the refrigerant pump 34 is located near a bottom dead center, and when the permanent magnet 323a approaches the work chamber 311 of the high temperature container 31a, a magnetic field is impressed to the magnetic working element 30 of the work chamber 311, so that the magnetism is increased in a magnetic-field impression process. At this time, the magnetic working element 30 generates heat, and a temperature of the refrigerant in the work chamber 311 is raised, due to the magneto-caloric effect.

Then, the piston 343 moves to a top dead center from the bottom dead center, and the refrigerant of the work chamber 311 moves to the high temperature refrigerant port 312 from the refrigerant pump 34. At this time, the discharge valve 312d of the refrigerant outlet 312b is opened, and high-temperature refrigerant existing near the first end portion 311a of the work chamber 311 is discharged from the refrigerant outlet 312b toward the heating heat exchanger 13 in a refrigerant discharge process.

Then, when the piston 343 is located near the top dead center, and when the permanent magnet 323a is separated away from the work chamber 311 of the high temperature container 31a, the magnetic field is removed from the magnetic working element 30 so that the magnetism is decreased in a magnetic-field removal process.

Then, the piston 343 moves to the bottom dead center from the top dead center, and the refrigerant of the work chamber 311 moves to the refrigerant pump 34 from the high temperature refrigerant port 312. At this time, the suction valve 312c of the refrigerant outlet 312a is opened, and refrigerant flowing out of the heating heat exchanger 13 is drawn to near the refrigerant inlet 312a in a refrigerant suction process. When the piston 343 of the refrigerant pump 34 returns to the bottom dead center, the next magnetic-field impression process is conducted.

Due to the four processes such as the magnetic-field impression process, the refrigerant discharge process, the magnetic-field removal process, and the refrigerant suction process, the hot energy produced by the magneto-caloric effect of the magnetic working element 30 of the high temperature container 31a can be transported to the heating heat exchanger 13.

In the work chamber 311 of the low temperature container 31b, when the magnetic field is removed from the work chamber 311 of the high temperature container 31a, a magnetic field is impressed to the magnetic working element 30 of the low temperature container 31b in a state where the piston 343 is located near the top dead center.

Then, the piston 343 moves to the bottom dead center from the top dead center, and the refrigerant of the work chamber 311 moves to the refrigerant pump 34 from the low temperature port 313. At this time, the suction valve 313c of the refrigerant inlet 313a of the low temperature port 313 is opened, and the refrigerant flowing out of the cooling heat exchanger 12 is drawn to near the refrigerant inlet 313a in a refrigerant suction process.

Then, in the work chamber 311 of the low temperature container 31b, the magnetic field is removed from the magnetic working element 30 in the work chamber 311 in a state where the piston 343 is located near the bottom dead center, when the magnetic field is impressed to the work chamber 311 of the high temperature container 31a.

Then, the piston 343 moves to the top dead center from the bottom dead center, and the refrigerant of the work chamber 311 moves to the low temperature port 313 from the refrigerant pump 34. At this time, the discharge valve 313c of the refrigerant outlet 313b of the low temperature port 313 is opened, and low-temperature refrigerant existing near the refrigerant outlet 313b of the second end part 311b of the work chamber 311 is discharged toward the cooling heat exchanger 12 in a refrigerant discharge process.

Due to the four processes such as the magnetic-field impression process, the refrigerant suction process, the magnetic-field removal process, and the refrigerant discharge process, the cold energy produced by the magneto-caloric effect of the magnetic working element 30 accommodated in the low temperature container 31b can be transported to the cooling heat exchanger 12.

If the heat exchange container 31 is considered as a whole, after the magnetic field is impressed to the magnetic working element 30, refrigerant moves toward the high temperature port 312 adjacent to the first end part 311a from the low temperature port 313 adjacent to the second end part 311b. After the magnetic field is removed from the magnetic working element 30, refrigerant moves toward the low temperature port 313 from the high temperature port 312.

When the magnetic-field impression process, the refrigerant discharge process, the magnetic-field removal process, and the refrigerant suction process are repeated in the high temperature container 31a, and when the magnetic-field impression process, the refrigerant suction process, the magnetic-field removal process, and the refrigerant discharge process are repeated in the low temperature container 31b, a big temperature gradient can be generated between the magnetic working element 30 of the high temperature container 31a and the magnetic working element 30 of the low temperature container 31b.

Next, the high temperature circuit 4 and the low temperature circuit 5 are explained. The high temperature circuit 4 introduces refrigerant flowing out of the refrigerant outlet 312b of the high temperature port 312 of the high temperature container 31a to a refrigerant inlet 13a of the heating heat exchanger 13. Further, the high temperature circuit 4 introduces refrigerant flowing out of a refrigerant outlet 13b of the heating heat exchanger 13 to the refrigerant inlet 312a of the high temperature port 312 of the high temperature container 31a.

Specifically, the refrigerant inlet 13a of the heating heat exchanger 13 is connected to the refrigerant outlet 312b of the high temperature port 312. The heating heat exchanger 13 is arranged in a case 11 of the indoor air-conditioning unit 10. The refrigerant flowing through the heating heat exchanger 13 exchanges heat with air after passing through the cooling heat exchanger 12. Thus, the heating heat exchanger 13 heats the air, and corresponds to a first heat exchanger. The cooling heat exchanger 12 corresponds to a second heat exchanger.

As shown in FIG. 1, a first electric three-way valve 41 is connected to the refrigerant outlet 13b of the heating heat exchanger 13. The first three-way valve 41 is a switching portion that switches passages, and is controlled with a control signal output from the air-conditioning controller 100.

More specifically, in response to the control signal output from the air-conditioning controller 100, the first three-way valve 41 switches the refrigerant outlet 13b of the heating heat exchanger 13 to communicate with the refrigerant inlet 312a of the high temperature container 31a or a heat-emitting refrigerant inlet 61a of a third heat exchanger 6.

The third heat exchanger 6 is an outdoor heat exchanger arranged in the engine compartment, and heat is exchanged between the refrigerant and outside air. The third heat exchanger 6 has two heat-exchange parts such as a heat emitting part 61 and a heat absorbing part 62. Refrigerant flowing out of the heating heat exchanger 13 flows into the heat emitting part 61. Refrigerant flowing out of the low temperature container 31b flows into the heat absorbing part 63.

In the heat emitting part 61 of the third heat exchanger 6, the refrigerant entering through the inlet 61a from the heating heat exchanger 13 exchanges heat with outside air. In the heat absorbing part 62 of the third heat exchanger 6, the refrigerant entering through a heat-absorbing refrigerant inlet 62a from the low temperature container 31b exchanges heat with outside air.

Refrigerant passage of the heat emitting part 61 and refrigerant passage of the heat absorbing part 62 are independent from each other in the third heat exchanger 6 so that refrigerant of the heat emitting part 61 and refrigerant of the heat absorbing part 62 are restricted from being mixed with each other.

The refrigerant inlet 312a of the high temperature container 31a is connected to the heat-emitting outlet 61b of the third heat exchanger 6. Refrigerant emits heat in the third heat exchanger 6, and returns to the work chamber 311 of the high temperature container 31a.

That is, the high temperature circuit 4 has a first circuit and a second circuit. In the first circuit, refrigerant flows in order of the refrigerant outlet 312b of the high temperature container 31a, the heating heat exchanger 13, the first valve 41, the refrigerant inlet 312a of the high temperature container 31a. In the second circuit, refrigerant flows in order of the refrigerant outlet 312b of the high temperature container 31a, the heating heat exchanger 13, the first valve 41, the heat emitting part 61 of the third heat exchanger 6, and the refrigerant inlet 312a of the high temperature container 31a.

A reservoir tank 43 is connected to the high temperature circuit 4 through a fixed diaphragm 42, and is located between the heating heat exchanger 13 and the first electric three-way valve 41. The reservoir tank 43 is used for controlling the amount of refrigerant flowing through the circuit 4. The fixed diaphragm 42 may be constructed by an orifice or a capillary tube, for example.

The low temperature circuit 5 introduces refrigerant flowing out of the refrigerant outlet 313b of the low temperature port 313 of the low temperature container 31b to the refrigerant inlet 12a of the cooling heat exchanger 12. Further, the low temperature circuit 5 introduces refrigerant flowing out of the refrigerant outlet 12b of the cooling heat exchanger 12 to return to the refrigerant inlet 313a of the low temperature port 313.

Specifically, a second electric three-way valve 51 is connected to the refrigerant outlet 313b of the low temperature port 313. The second electric three-way valve 51 is a switching portion that switches passages and is controlled by a control signal output from the air-conditioning controller 100, similarly to the first electric three-way valve 41.

In response to the control signal output from the air-conditioning controller 100, the second electric three-way valve 51 switches the refrigerant outlet 313b of the low temperature port 313 of the low temperature container 31b to communicate with a heat-absorbing inlet 62a of the third heat exchanger 6 or a third electric three-way valve 52. The third electric three-way valve 52 is connected to a heat-absorbing outlet 62b of the third heat exchanger 6.

The third electric three-way valve 52 is a switching portion that switches passages and is controlled by a control signal output from the air-conditioning controller 100, similarly to the first and second electric three-way valves 41 and 51.

Specifically, the third three-way valve 52 operates in synchronization with the second three-way valve 51. That is, when the second valve 51 switches the refrigerant outlet 313b of the low temperature port 313 to communicate with the third valve 52, the third valve 52 switches the second valve 51 to communicate with the refrigerant inlet 12a of the cooling heat exchanger 12.

Moreover, when the second valve 51 switches the refrigerant outlet 313b of the low temperature port 313 to communicate with the heat-absorbing inlet 62a of the third heat exchanger 6, the third valve 52 switches the second valve 51 to communicate with the refrigerant inlet 313a of the low temperature port 313.

The cooling heat exchanger 12 is connected to the third electric three-way valve 52, and is arranged in the case 11 of the indoor air-conditioning unit 10. The cooling heat exchanger 12 is located upstream of the heating heat exchanger 13 in the air flowing direction. Refrigerant flowing through the cooling heat exchanger 12 exchanges heat with air, so that air is cooled by the heat exchanger 12. The refrigerant inlet 313a of the low temperature port 313 is connected to the refrigerant outlet 12b of the cooling heat exchanger 12.

Thus, the low temperature circuit 5 has a first circuit and a second circuit. In the first circuit, refrigerant flows in order of the refrigerant outlet 313b of the low temperature container 31b, the second valve 51, the third valve 52, the cooling heat exchanger 12, and the refrigerant inlet 313a of the low temperature container 31b. In the second circuit, refrigerant flows in order of the refrigerant outlet 313b of the low temperature container 31b, the heat absorbing part 62 of the third heat exchanger 6, the second valve 51, the third valve 52 and the refrigerant inlet 313a of the low temperature container 31b.

A reservoir tank 54 is connected to the low temperature circuit 5 through a fixed diaphragm 53, and is located between the second valve 51 and the third valve 52 in the first circuit. The reservoir tank 54 is located between the third heat exchanger 6 and the third valve 52 in the second circuit. The reservoir tank 54 is used for controlling the amount of refrigerant flowing through the circuit 5. The fixed diaphragm 53 may be constructed by an orifice or a capillary tube, for example.

The indoor air-conditioning unit 10 will be described. The indoor air-conditioning unit 10 is arranged inside of an instrument board that is located at the most front part of the passenger compartment. A blower (not shown), the cooling heat exchanger 12, the heating heat exchanger 13, and a heater core 14 are accommodated in the case 11.

The casing 11 defines an air passage for air to be sent into the passenger compartment. The casing 31 is made of resin such as polypropylene, for example, having a certain elasticity and an outstanding strength. An inside-and-outside change box (not shown) is arranged at the most upstream of the case 11 in the air flow direction so as to switch to introduce inside air (air in the passenger compartment) and/or outside air (air outside of the passenger compartment).

The blower is arranged downstream of the box in the air flow direction so as to send air drawn through the box toward the passenger compartment. The blower may be made of a centrifugal multi-blade fan such as sirocco fan and is driven by an electric motor. A rotation number of the blower is controlled by a control voltage output from the air-conditioning controller 100. Thus, an amount of air sent by the blower can be controlled.

The cooling heat exchanger 12 is arranged downstream of the blower in the air flow direction. The air passage defined in the case 11 has a heating passage 15, a bypass passage 16 bypassing the heating passage 15, and a mixture space 17. The air passage is located downstream of the cooling heat exchanger 12 in the air flow direction, and air passing through the cooling heat exchanger 12 passes through the air passage. Air passing through the heating passage 15 and air passing through the bypass passage 16 are mixed in the mixture space 17.

The heating heat exchanger 13 and the heater core 14 are arranged in this order in the heating passage 15 as a heater portion that heats the air after passing through the cooling heat exchanger 12 in the air flow direction. In the heater core 14, cooling water of an engine (not shown) outputting drive force exchanges heat with the air passing through the cooling heat exchanger 12.

Due to the bypass passage 16, air passing through the cooling heat exchanger 12 is introduced into the mixture space 17 without passing through the heating heat exchanger 13 and the heater core 14. Therefore, a temperature of air in the mixture space 17 is controlled by controlling a ratio of air passing through the heating passage 15 and air passing through the bypass passage 16.

An air mixing door 18 is arranged between the cooling heat exchanger 12 and the passages 15, 16 so as to continuously change the ratio of the airs. The air mixing door 18 controls the amount of air flowing into the heating heat exchanger 13 so as to control the temperature of air sent to the passenger compartment.

Air outlets (not shown) such a face outlet, foot outlet and defroster outlet are defined most downstream end of the case 11 in the air flow direction. Air is sent from the mixture space 17 into the passenger compartment through the outlets. In addition, a door which adjusts the opening area of the air outlet is arranged at upstream of the air outlet. It is possible to change the air outlet which blows off the conditioned air into the passenger compartment by opening/closing the door.

The air-conditioning controller 100 includes a microcomputer and a circumference circuit. The microcomputer has CPU, ROM, RAM, etc. Calculations and processings are performed based on control program memorized in the ROM of the controller 100. The electric motor 35, the valves 41, 51, and 52, the blower, and the air mixing door 18 are connected to the output side of the controller 100, and are controlled by the controller 100.

A console panel (not shown) is arranged near the instrument board in the passenger compartment, and has a variety of switches. Manipulate signals are input into the controller 100 through the switches formed. For example, the switches includes an activation switch of the air-conditioner 1, an auto mode switch, a switch for selecting the mode of operation such as cooling mode, heating mode, and dehumidification mode, and the like.

The controller 100 has a drive portion driving the magnetic refrigerator 3 by controlling the electric motor 35 and a switching portion that switches the passages by controlling the valve 41, 51, 52.

The cooling operation, heating operation, or dehumidification operation is performed by the air-conditioner 1 and is controlled by the controller 100 based on the operations of the switches of the console panel.

For example, in the cooling operation, the air-conditioning controller 100 controls the high temperature circuit 4 in a manner that the heat-emitting inlet 61a of the third heat exchanger 6 communicate with the refrigerant outlet 13b of the heating heat exchanger 13 by controlling the first valve 41. Further, the low temperature circuit 5 is controlled in a manner that the third valve 52 communicates with the refrigerant outlet 313b of the low temperature port 313 of the low temperature container 31b by controlling the second valve 51. Moreover, the second valve 51 is made to communicate with the refrigerant inlet 12a of the cooling heat exchanger 12 by controlling the third valve 52.

In the heating operation, the air-conditioning controller 100 controls the high temperature circuit 4 in a manner that the refrigerant inlet 312a of the high temperature container 31a communicates with the refrigerant outlet 13b of the heating heat exchanger 13 by controlling the first valve 41. Further, the low temperature circuit 5 is controlled in a manner that the heat-absorbing inlet 62a of the third heat exchanger 6 communicates with the refrigerant outlet 313b of the low temperature port 313 of the low temperature container 31b by controlling the second valve 51. Moreover, the second valve 51 is made to communicate with the refrigerant inlet 313a of the low temperature port 313 of the low temperature container 31b by controlling the third valve 52.

In the dehumidification operation, the air-conditioning controller 100 controls the high temperature circuit 4 in a manner that the refrigerant inlet 312a of the high temperature container 31a communicates with the refrigerant outlet 13b of the heating heat exchanger 13 by controlling the first valve 41. Further, the low temperature circuit 5 is controlled in a manner that the third valve 52 communicates with the refrigerant outlet 313b of the low temperature port 313 of the low temperature container 31b by controlling the second valve 51. Moreover, the second valve 51 is made to communicate with the refrigerant inlet 12a of the cooling heat exchanger 12 by controlling the third valve 52.

Thus, in each mode operation, the passenger compartment can be air-conditioned using the hot energy obtained by the first end part 311a of the work chamber 311 and the cold energy obtained by the second end part 311b of the work chamber 311.

Next, the magnetic working element 30 is explained.

Figure 4:
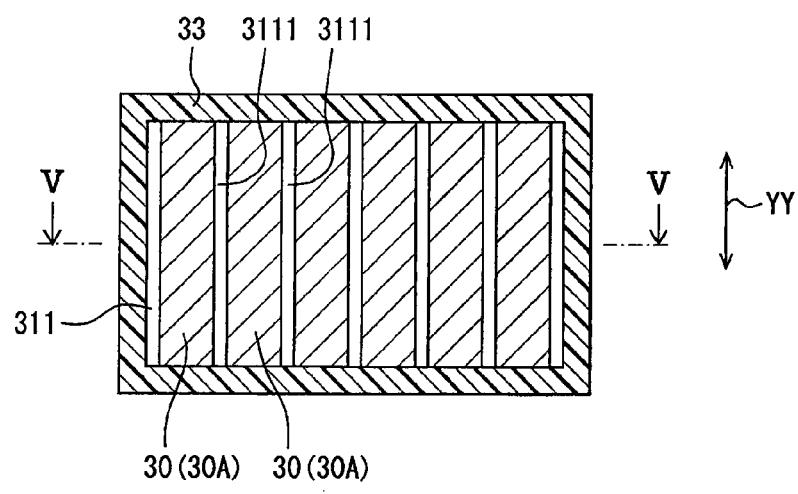
FIG. 4 is a radial cross-sectional view illustrating a work chamber defined by a container of the magnetic heat pump apparatus.
Figure 5:
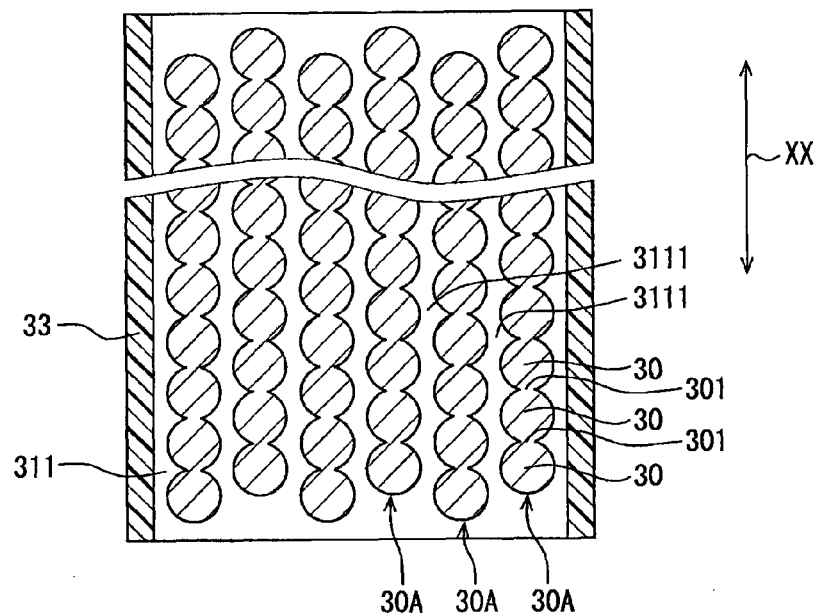
FIG. 5 is a cross-sectional view taken along a line V-V of FIG. 4.

FIG. 4 is a radial sectional drawing illustrating one work chamber 311 of the container 31a, 31b, and FIG. 5 is a sectional drawing taken along a line V-V of FIG. 4.

As shown in FIGS. 4 and 5, the work chamber 311 is defined in the holding member 33, and a large number of the magnetic working elements 30 are arranged in the work chamber 311.

As shown in FIG. 4, the respective magnetic working element 30 extends in a radial direction YY of the heat exchange container 31. The radial direction YY is equal to the magnetic-field direction YY in which the magnetic field is impressed to the element 30 by the magnetic-field applier 32. That is, each of the magnetic working elements 30 has a column shape extending in the magnetic-field direction YY.

As shown in FIG. 5, the sectional shape of the magnetic working element 30 is round. The same round sectional shapes continue in the axis direction XX. Because refrigerant flows in both-way (reciprocates) along the axis direction, the axis direction XX is equal to the reciprocation direction XX.

Moreover, as shown in FIG. 5, the plural column-shaped magnetic working elements 30 are arranged in a line in the reciprocation direction XX with uniform pitch. The magnetic working elements 30 located adjacent to each other in the reciprocation direction XX are joined and integrated with each other into a line unit 30A extending in the reciprocation direction XX.

In the one work chamber 311, a plurality of line units 30A are arranged with predetermined interval in an arrangement direction perpendicular to the reciprocation direction XX and the magnetic-field direction YY. The arrangement direction corresponds to the circumference direction, in this embodiment. As shown in FIGS. 4 and 5, a refrigerant passage 3111 is defined between the line units 30A located adjacent with each other in the arrangement direction, and refrigerant flows along the refrigerant passage 3111 in the reciprocation direction XX.

Figure 6:
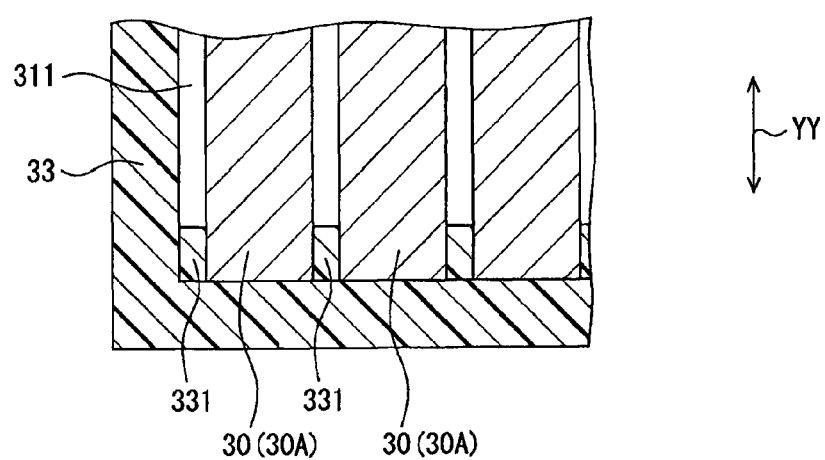
FIG. 6 is an enlarged cross-sectional view illustrating a spacer arranged between magnetic working elements of the magnetic heat pump apparatus.

As shown in FIG. 6, a spacer 331 is arranged between the line units 30A in the arrangement direction. The line unit 30A has an end portion in the radial direction YY, and the spacer 331 is located between the end portions of the line units 30A in the arrangement direction. Therefore, a predetermined interval is defined by the spacer 331 between the line units 30A, and extends in the reciprocation direction XX. Further, the spacer 331 is arranged between the line unit 30A and a side wall surface of the holding member 33.

Moreover, as shown in FIG. 5, the line unit 30A is defined in a manner that axial lines of the magnetic working elements 30 have approximately the same pitch in the reciprocation direction XX. That is, the interval between the axial lines is uniform in the reciprocation direction XX.

Furthermore, positions of the lines units 30A adjacent with each other in the arrangement direction is shifted in the reciprocation direction XX by about half of the interval defined between the axial lines of the elements 30.

As shown in FIG. 5, the column-shaped elements 30 are jointed with each other in the reciprocation direction XX through a joint part 301. The positions of the joint parts 301 are shifted in the reciprocation direction XX between the line units 30A located adjacent to each other in the arrangement direction by about half of the interval, so that the joint parts 301 are alternately located between the line units 30A located adjacent to each other in the arrangement direction. A dimension of the joint part 301 in the arrangement direction is smaller than that of the other part of the line unit 30A other than the joint part 301.

Thereby, as shown in FIG. 5, the refrigerant passage 3111 defined between the line units 30A located adjacent with each other is slightly bent. Therefore, the refrigerant passage 3111 extends in the reciprocation direction XX in a manner that a dimension of the refrigerant passage 3111 in the arrangement direction can be made almost uniform.

Moreover, a sectional area of the joint part 301 perpendicular to the reciprocation direction XX is smaller than a sectional area of the other part. Therefore, the joint part 301 works as a restricting portion that restricts the heat transfer in the reciprocation direction XX. Thus, the heat transfer can be restricted from being conducted from the high temperature side to the low temperature side. In other words, due to the joint part 301, heat becomes difficult to be transported from the first end part 311a of the work chamber 311 to the second end part 311b of the work chamber 311, in the line unit 30A.

An example method of manufacturing the line unit 30A will be described with reference to FIGS. 7A, 7B, 7C and 7D.

Figure 7A:
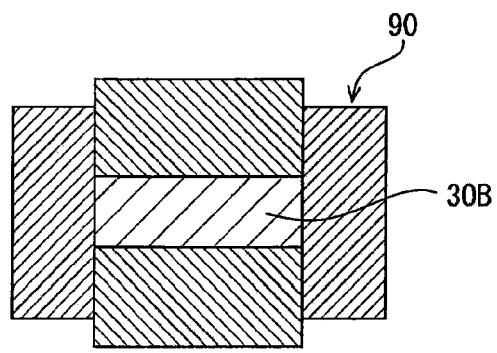
FIG. 7A, FIG. 7B, FIG. 7C and FIG. 7D are schematic views illustrating a manufacture method of a line unit of the magnetic working element.
Figure 7B:
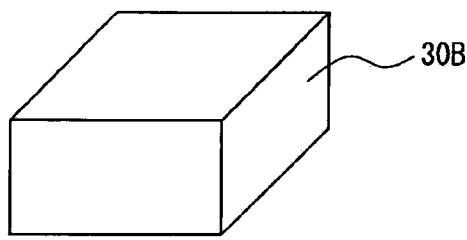
Figure 7C:
Figure 7D:
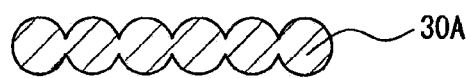

As shown in FIG. 7A, raw material powder having magneto-caloric effect is filled into a metal mold 90, and a sintering process is conducted, for example, using discharge plasma, so that a rectangular parallelepiped shape ingot 30B is obtained, as shown in FIG. 7B. The ingot 30B is processed into a predetermined shape, for example, using a wire-cut electric discharge machine, as shown in FIG. 7C. Thus, the line unit 30A shown in FIG. 7D can be acquired.

The spacer 331 is interposed between the line units 30A, as shown in FIG. 6. An end portion of the line unit 30A in the radial direction YY may be bonded with the spacer 331. Thus, the plural line units 30A are combined and mounted to the holding member 33.

According to the embodiment, the column-shaped magnetic working element 30 has the axial line extending in the magnetic-field direction YY. The plural elements 30 arranged in the reciprocation direction XX are integrated into the line unit 30A extending in the reciprocation direction XX. The plural line units 30A are arranged in the arrangement direction perpendicular to the magnetic-field direction YY and the reciprocation direction XX. Due to the pump 34, refrigerant flows to reciprocate in the reciprocation direction XX that is approximately perpendicular to the magnetic-field direction YY.

Thereby, the contact surface area can be increased between the magnetic working element 30 and refrigerant, so that heat exchange is facilitated between the magnetic working element 30 and heat medium. Moreover, the magnetic reluctance can be reduced when the magnetic-field applier 32 applied a magnetic field to the magnetic working element 30. Therefore, increase in the heat amount generated when the magnetic field is applied and decrease in the heat amount generated when the magnetic field is removed are made larger.

Each of the magnetic working elements 30 continuously has approximately the same round cross-section in an axis direction of the column shape. Therefore, the magnetic field can be uniformly applied to the element 30 by the magnetic-filed applier 32.

Each of the line units 30A extends in the reciprocation direction XX of refrigerant. Therefore, flow resistance of refrigerant can be made comparatively small in the work chamber 311.

The line units 30A located adjacent to each other in the arrangement direction are offset from each other in the reciprocation direction XX by about half of the interval between the axial lines of the elements 30. Therefore, the width of the refrigerant passage 3111 between the line units 30A in the arrangement direction can be made almost uniform in the reciprocation direction XX. The passage 3111 extends in the reciprocation direction XX with the uniform width. Thus, flow resistance of refrigerant can be made comparatively small in the work chamber 311, even when the plural line units 30A are arranged in the work chamber 311.

The plural elements 30 are integrated into the line unit 30A, so that the line unit 30A can be easily arranged in the container 31a, 31b. Further, the cross-sectional area of the joint part 301 is smaller than that of the other part, and the joint part 301 functions as a restricting portion that restricts the heat transfer. Therefore, heat can be restricted from being transported from the element 30 storing hot energy in the first end part 311a to the element 30 storing cold energy in the second end part 311b even when the magnetic working elements 30 are integrated into the line unit 30A.

According to the embodiment, properties such as pressure loss and magnetic reluctance can be improved. Moreover, compared with a case where a magnetic working element has a thin board shape extending in the reciprocation direction, according to the embodiment, heat exchange performance can be raised, and the heat transport can be restricted in the reciprocation direction.

The present disclosure is not limited to the above embodiment.

Figure 8:
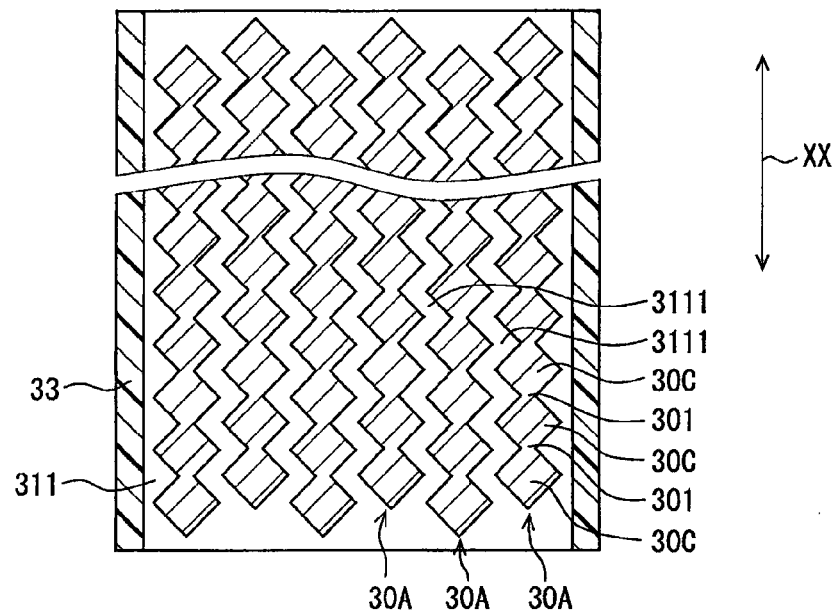
FIG. 8 is a cross-sectional view illustrating a line unit of the magnetic working element according to a modification example.
Figure 9:
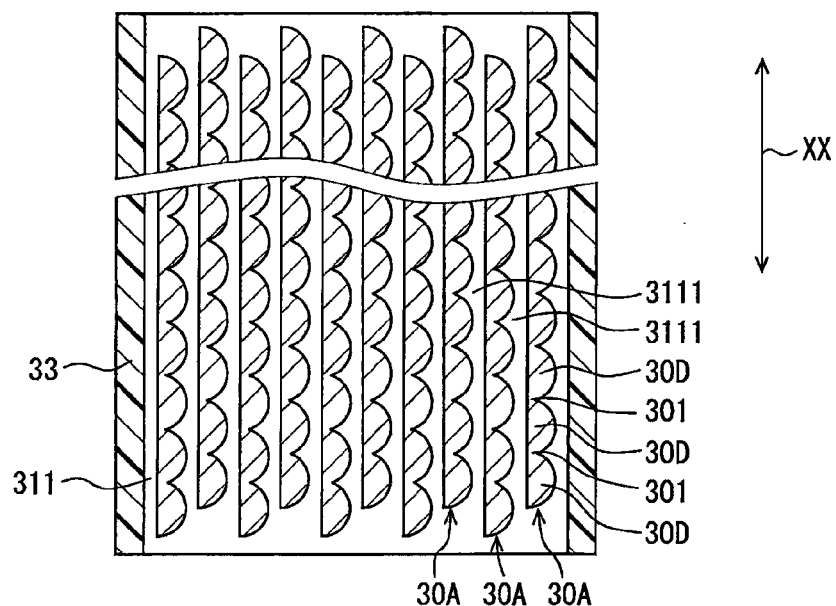
FIG. 9 is a cross-sectional view illustrating a line unit of the magnetic working element according to a modification example.

The shape of the magnetic working element 30 is not limited to the above description. For example, as shown in FIG. 8, the elements 30 may be integrated into a unit 30C as a modification example. In the unit 30C, the elements 30 have square-shaped cross-section which is perpendicular to the magnetic-field direction YY. Alternatively, as shown in FIG. 9, the elements 30 may be integrated into a unit 30D as a modification example. In the unit 30D, the elements 30 have semicircle-shaped cross-section which is perpendicular to the magnetic-field direction YY.

Figure 10:
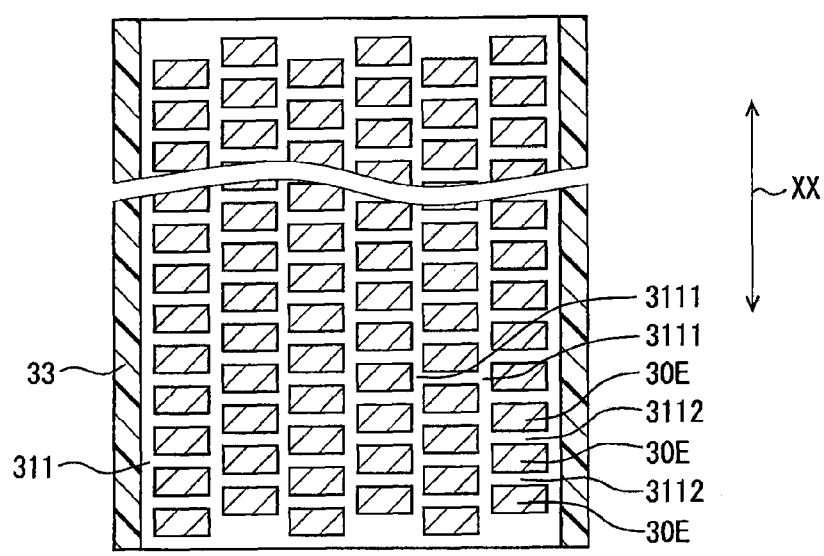
FIG. 10 is a cross-sectional view illustrating a line unit of the magnetic working element according to a modification example.

Moreover, in a modification example shown in FIG. 10, plural magnetic working elements 30E are separated from each other in the reciprocation direction XX.

In this case, a refrigerant passage 3112 is defined between the plural magnetic working elements 30E located adjacent with each other in the reciprocation direction XX, and can be operate as a restricting portion that restricts heat transfer. Therefore, the refrigerant passage 3112 restricts heat transfer from the magnetic working element 30E storing hot energy on the first end part 311a to the magnetic working element 30E storing cold energy on the second end part 311b.

The magnetic working element 30 is not limited to have the column shape with the same sectional shape in the axial direction. For example, the magnetic working element 30 may have a waist-widened column shape in which the diameter is large in the center section than the both end portions in the axial direction, or a waist-narrowed column shape in which the diameter is small in the center section than the both end portions in the axial direction. Further, the magnetic working element 30 may have a cone shape in which the sectional area is gradually varied from a first end to a second end in the axial direction.

Figure 11:
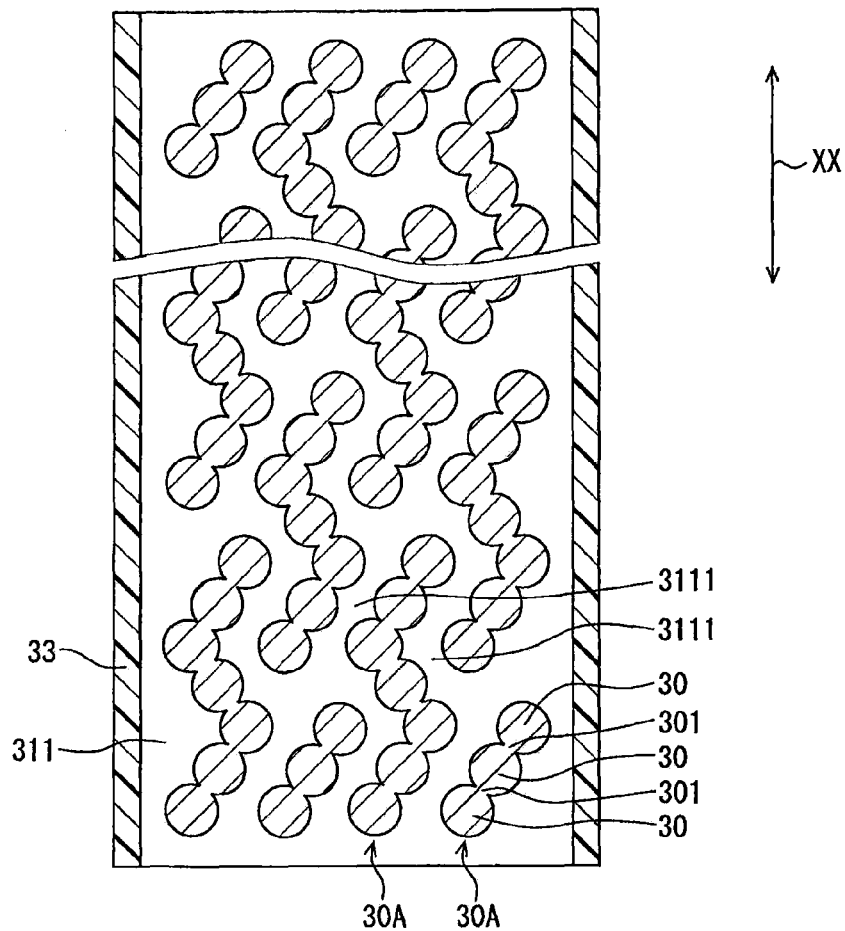
FIG. 11 is a cross-sectional view illustrating a line unit of the magnetic working element according to a modification example.

Moreover, the line unit 30A is not limited to extend in the reciprocation direction XX. For example, as shown in FIG. 11, the line unit 30A may extend in a direction intersecting the reciprocation direction XX. In this case, the refrigerant passage 3111 extends in the direction intersecting the reciprocation direction XX, and heat exchange can be facilitated between the magnetic working element 30 and refrigerant.

Figure 12:
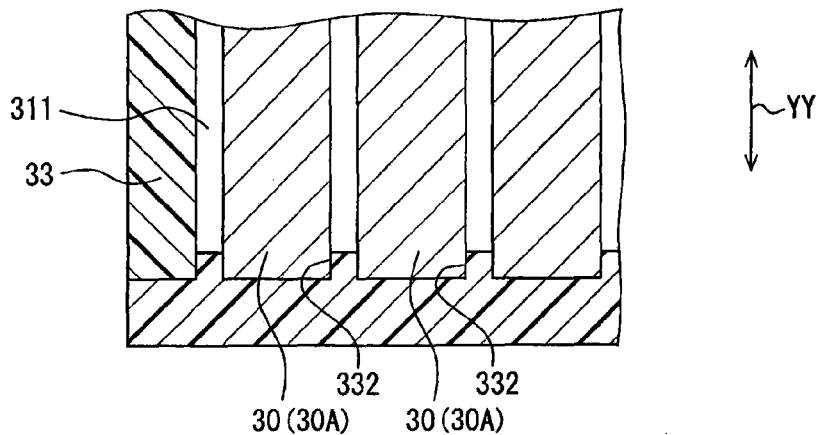
FIG. 12 is an enlarged cross-sectional view illustrating a groove to which the magnetic working element is fitted.

In the embodiment, the spacer 331 is interposed between the line units 30A to define the predetermined interval in the arrangement direction perpendicular to the reciprocation direction XX and the magnetic-field direction YY. Alternatively, as shown in FIG. 12, a groove 332 is defined in a wall part of the holding member 33 and an axial end of the element 30 is fitted to the groove 332. In this case, the line units 30A can be arranged through the predetermined interval in the arrangement direction.

The reciprocation direction XX and the magnetic-field direction YY are not limited to be perpendicular with each other, and may only intersect with each other.

The magnetic field may be generated by an electromagnet which generates the magnetic field by being supplied with electricity, instead of the permanent magnet 323.

In the above embodiment, heat of high-temperature refrigerant is emitted to external fluid by circulating through the heating heat exchanger 13 from the first end part 311a, and low-temperature refrigerant absorbs heat from external fluid by circulating through the cooling heat exchanger 12 from the second end part 311b. Alternatively, heat exchange may be performed directly in the first end part 311a and the second end part 311b between heat medium and external fluid.

Such changes and modifications are to be understood as being within the scope of the present disclosure as defined by the appended claims.

What is claimed is:

1. A magnetic heat pump apparatus comprising: a container defining a work chamber, heat medium reciprocating between a first end part and a second end part of the work chamber in a reciprocation direction; a magnetic working element made of a magnetic working substance having magneto-caloric effect, the magnetic working element being arranged in the work chamber and located between the first end part and the second end part; a magnetic-field applier that alternately applies a magnetic field to the magnetic working element and removes the magnetic field from the magnetic working element in a magnetic-field direction intersecting with the reciprocation direction; a transportation device that transports the heat medium in synchronization with the applying and the removal of the magnetic field; a heat emitting portion that emits heat of the heat medium located adjacent to the first end part to outside; and a heat absorbing portion that absorbs outside heat into the heat medium located adjacent to the second end part, wherein the magnetic working element is one of a plurality of magnetic working elements arranged in the work chamber, each of the plurality of magnetic working elements has a column shape extending in the magnetic-field direction; the plurality of magnetic working elements are arranged in the reciprocation direction; the magnetic heat pump apparatus further comprising: a restricting portion is arranged between the magnetic working elements located adjacent to each other in the reciprocation direction, wherein the restricting portion restricts heat transport in the reciprocation direction; the plurality of magnetic working elements located adjacent each other in the reciprocation direction are integrally joined with each other into a unit, the restricting portion has a sectional area perpendicular to the reciprocation direction, and the sectional area of the restricting portion is smaller than that of the other portion of the unit other than the restricting portion, the restricting portion is defined by a joint part through which the plurality of magnetic working elements are integrally joined with each other; and each of the plurality of magnetic working elements has the same cross-section in the reciprocation direction and wherein the cross-section in the reciprocation direction continuously extends in the magnetic field direction.

2. The magnetic heat pump apparatus according to claim 1, wherein
the plurality of magnetic working elements arranged in the reciprocation direction defines a line unit extending in the reciprocation direction, and interval between axial lines of the plurality of magnetic working elements is uniform in the reciprocation direction,
the line unit is one of a plurality of line units arranged through clearances in an arrangement direction perpendicular to the reciprocation direction and the axial lines, and
positions of the line units located adjacent to each other in the arrangement direction are shifted from each other in the reciprocation direction by half of the interval.

3. The magnetic heat pump apparatus according to claim 1, wherein
the plurality of magnetic working elements arranged in the reciprocation direction is distanced from each other in the reciprocation direction, and
the restricting portion is defined by a passage through which the heat medium flows, the passage being defined between the plurality of magnetic working elements located adjacent to each other in the reciprocation direction.

4. The magnetic heat pump apparatus according to claim 1, wherein the column shape has a diameter which is constant from a first end of the work chamber to a second end of the work chamber in the magnetic-field direction.

5. The magnetic heat pump apparatus according to claim 1, wherein a refrigerant passage is defined between the plurality of magnetic working elements, and extends in the reciprocation direction and the magnetic-field direction with a uniform width.

6. The magnetic heat pump apparatus according to claim 1, wherein the plurality of magnetic working elements located adjacent to each other in the reciprocation direction are integrally joined with each other to form a single unit.

7. The magnetic heat pump apparatus according to claim 1, wherein the plurality of magnetic working elements located adjacent to each other in the reciprocation direction are permanently joined with each other to form a single unit.

8. The magnetic heat pump apparatus according to claim 1, wherein each of the plurality of magnetic working elements having the column shape extends continuously without interruption of the magnetic working substance in the magnetic-field direction.

9. The magnetic heat pump apparatus according to claim 1, wherein each of the magnetic working elements having the column shape is a cylindrical shape.

10. The magnetic heat pump apparatus according to claim 9, wherein the cylindrical element is a circular cylindrical shape.

11. The magnetic heat pump apparatus according to claim 1, wherein the unit formed by the plurality of magnetic working elements located adjacent each other in the reciprocation direction and integrally joined by the restricting portion extends continuously without interruption of the magnetic working substance in the reciprocation direction.

12. The magnetic heat pump apparatus according to claim 1, wherein the restriction portion arranged between the magnetic elements located adjacent to each other extends continuously in the reciprocation direction over an entire length of the magnetic working elements in the reciprocation direction.

* * * * *